United States Patent [19]

Eckbreth

[11] 4,277,760
[45] Jul. 7, 1981

[54] CROSSED-BEAM PHASE-MATCHED COHERENT ANTI-STOKES RAMAN SPECTROSCOPY

[75] Inventor: Alan C. Eckbreth, Glastonbury, Conn.

[73] Assignee: United Technologies Corporation, Hartford, Conn.

[21] Appl. No.: 25,649

[22] Filed: Mar. 30, 1979

[51] Int. Cl.³ .............................................. H01S 3/30
[52] U.S. Cl. .............................................. 331/94.5 N
[58] Field of Search .................................. 331/94.5 N

[56] References Cited

PUBLICATIONS

"Coherent anti-Stokes Raman Spectroscopy" by Begley et al., Apl. Phys. Lett., vol. 25, No. 7, (1 Oct. '74).
"Noncollinear phase matching in GaAs" by Aggarwal et al., Appl. Phys. Lett., vol. 22, No. 7 (1 Apr. '73).

Primary Examiner—William L. Sikes
Assistant Examiner—Leon Scott, Jr.

[57] ABSTRACT

A method for generating coherent anti-Stokes Raman radiation having high spatial resolution is disclosed. Three input beams are focused into an interaction zone where three wave mixing occurs to generate a coherent anti-Stokes Raman beam. The angular separation between the focused beams is controllable according to simple geometric relationships for phase matching the beams.

4 Claims, 7 Drawing Figures

CROSSED-BEAM PHASE-MATCHED COHERENT ANTI-STOKES RAMAN SPECTROSCOPY

The Government has rights in this invention pursuant to Contract No. 68-02-2176 awarded by the Environmental Protection Agency.

BACKGROUND OF THE INVENTION

This invention relates to coherent anti-Stokes Raman spectroscopy and more particularly to crossed-beam coherent anti-Stokes Raman spectroscopy.

Coherent anti-Stokes Raman spectroscopy (CARS) offers very promising potential for the diagnostic probing of high interference environments such as those typical of combustion processes and electric discharges. In CARS systems, incident laser beams at frequencies $\omega_1$ and $\omega_2$ interact through the third order non-linear susceptibility $\chi^{(3)}(-\omega_3, \omega_1, \omega_1, -\omega_2)$ to generate a polarization component which produces coherent radiation at frequency $\omega_3$ equal to $2\omega_1-\omega_2$. When the frequency difference $\omega_1-\omega_2$ is close to the frequency of a Raman active resonance, $\omega_{Raman}$, within the environment being probed, the magnitude of the radiation at $\omega_3$, which is then at the anti-Stokes frequency relative to $\omega_1$, can become very large. The incident beams, that is $\omega_1$ and $\omega_2$ must be aligned so that the three wave mixing process is properly phased. Phase matching requires that $2\vec{K}_1=\vec{K}_2+\vec{K}_3$ where $\vec{K}_i$ is the wave vector at frequency $\omega_i$ with absolute magnitude equal to $\omega_i n_i/c$ where c is the speed of light and $n_i$ is the refractive index at a frequency $\omega_i$. For gases which are nearly dispersionless, phase matching occurs when the beams are collinearly mixed. Although this is easy to implement, collinear phase matching possesses a number of drawbacks from a diagnostic standpoint. In particular, since the CARS signal is coherent and represents an integrative effect, the spatial resolution cannot be well defined by imaging techniques, such as those successfully employed in spontaneous Raman approaches, to yield very fine spatial resolution. Collinear phase matching can result in poor and often ambiguous spatial resolution.

Since the CARS signal strength scales as the intensity product $I_1^2 I_2$, where $I_1$ is the intensity of a beam at $\omega_1$ and $I_2$ is the intensity of the beam at $\omega_2$, the incident laser beams are generally focused for diagnostic purposes when collinear phase matching is employed. For diffraction-limited beams, the interaction is assumed to occur primarily within a cylindrical volume of diameter v and length 6l given by the expression $v=4\lambda f/\Pi D$ and l is equal to $\Pi v^2/2\lambda$ where f is the focusing lens focal length, D is the beam diameter at the lens and $\lambda$ is the wavelength. As shown in Table 1 the probe volume focal diameter, the cross-sectional area, and the length are tabulated for various focal length lenses for a 1 centimeter diameter beam at 5320 Å. Depending upon the specific diagnostic circumstances, i.e. the focusing lens to measurement point separation, the spatial resolution may exceed that which is desired. Although the resolution is very good for short focal length lenses, gas breakdown may limit the input beam intensities and greatly diminish the CARS signal level. Additionally, many laser beams are not diffraction-limited, resulting in much poorer spatial resolution than that tabulated in Table 1. For example for a "three times diffraction limited" beam divergence angle, the linear resolution would be about an order of magnitude poorer. In the presence of density gradients, the resolution may further degrade since the CARS power also scales as a power of the gas density, typically the power being between 1 to 2. Also for specific applications, such as probing a flame in a burner operating at atmospheric pressure, significant contributions to the CARS signal may originate from cold, high density gas regions adjacent to the flame. Furthermore CARS signal contributions may be generated from various elements within the optical train, for example, the lenses and filters, when collinear phase matching is utilized. These contributions could be significant when low gas densities or weak resonances are being probed. Clearly it is desirable to avoid beam overlap and potential three wave mixing in all regions except the desired measurement location.

In an attempt to avoid collinearity, the $\omega_1$ and $\omega_2$ beams can be introduced at a slight angle to one another. As phase mismatch is deliberately introduced in this manner, the CARS signal generating efficiency will drop. For example at $\Delta K1\approx 3$ where $\Delta K$ is the magnitude of the phase mismatch, i.e. $|2\vec{K}_1-\vec{K}_2-\vec{K}_3|$ the CARS efficiency will have decreased by an order of magnitude. Although one could operate in this manner it is clearly inefficient and the actual spatial resolution will depend very critically on the precise angular separation of the beams.

SUMMARY OF THE INVENTION

A primary object of the present invention is to provide coherent anti-Stokes Raman radiation from a mixing volume having high spatial resolution.

A further object of the present invention is to provide coherent anti-Stokes Raman radiation having high intensity.

In accordance with the present invention, a method of generating coherent anti-Stokes Raman radiation comprises focusing three input beams into an interaction zone wherein three wave mixing of the beams occurs to generate a coherent anti-Stokes Raman beam. The three input beams comprise a first pumping beam having a first frequency $\omega_0$, a second pumping beam having a second frequency $\omega_1$ and a Stokes beam having a third frequency $\omega_2$. The coherent anti-Stokes Raman beam has a frequency $\omega_3$. The pumping beams and the Stokes beam are separated from one another to produce desired focusing angles to obtain appropriate phase matching of the beams. In one embodiment the three input beams are in a parallel relationship to one another to obtain focusing of the three beams in the same focal volume at the focal length of a common focusing lens. In another embodiment the input beams are focused into a mixing volume by three separate lenses.

A primary feature of the present invention is the non-collinear focusing of the input beams into the interaction zone to produce the coherent anti-Stokes Raman beams. Additionally three input beams are utilized to obtain three wave mixing. Also, appropriate phase-matching angles of the first pumping beam, the second pumping beam, the Stokes beam and the coherent anti-Stokes Raman beam are readily related from simple geometric considerations. Additionally, the angular separation between the input beams is sufficiently large to precluse CARS generation between the individual components. The coherent anti-Stokes Raman radiation is generated only in the interaction zone where all three input beams overlap leading to unambiguous spatial resolution. Additionally the input beams are not required to be coplanar.

An advantage of the present invention is the high spatial resolution obtainable in the measurement resulting from the small interaction zone of the three beams. Additionally, the interaction zone can be sized for the particular diagnostic application.

The foregoing and other objects, features and advantages of the present invention will become more apparent in the light of the following detailed description of the preferred embodiments thereof as discussed and illustrated in the accompanying drawing.

DESCRIPTION OF THE PREFERRED EMBODIMENT

Figure 1:
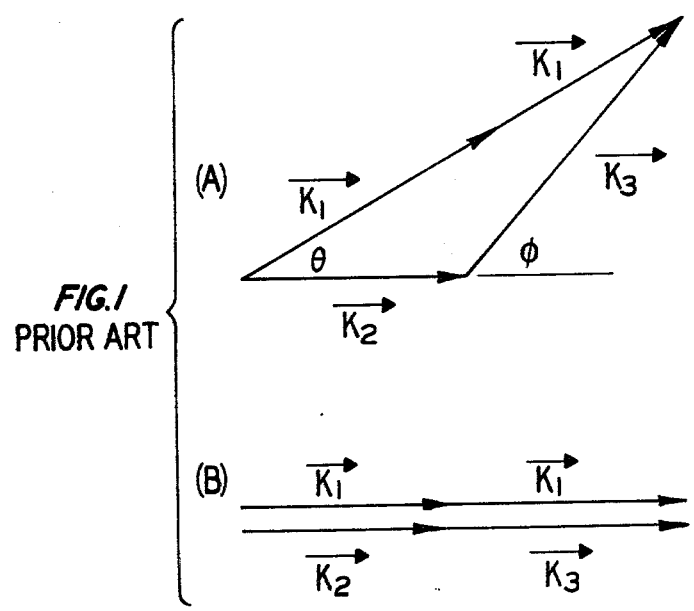
FIG. 1 is a schematic representation of a prior art CARS phase-matching diagram.

Referring now to FIG. 1, in prior art CARS phase-matching approaches, the input beams, typically referred to as the incident pump and Stokes laser beams respectively, must be aligned in a precise manner so that the CARS generation process is properly phased. The general phase-matching diagram for three wave mixing as shown in illustration (A) of FIG. 1 as disclosed by Begley et al in Applied Physics Letters, Vol. 25, pages 387-390, October 1974 requires that $2\vec{K}_1 = \vec{K}_2 + \vec{K}_3$ where $\vec{K}_{11}$ is the wave vector for the radiation at frequency $\omega_{11}$ and it has an absolute magnitude equal to $\omega_1 n_{11}/c$. As shown in illustration (A) of FIG. 1 the three wave mixing occurs when two photons designated $\vec{K}_1$ and $\vec{K}_1$ within a single pump beam are mixed with a photon from a Stokes beam designated $\vec{K}_2$ to generate a CARS signal designated $\vec{K}_3$. The CARS signal is the coherent anti-Stokes Raman radiation. The input beams $\vec{K}_1$ and $\vec{K}_2$ must be properly aligned so that the three wave mixing process is properly phased. As shown in illustration (A) of FIG. 1 phase matching requires that $2\vec{K}_1 = \vec{K}_2 + \vec{K}_3$.

The utilization of prior art CARS for probing a gas requires that the angle $\theta$, i.e. the angle between the two focused beams, be substantially zero resulting in the phase-matching diagram as shown in illustration (B) of FIG. 1. Since the refractive index is nearly invariant with frequency because gases are virtually dispersionless, the photon energy conservation condition, $\omega_3 = 2\omega_1 - \omega_2$ where $\omega_i$ is the frequency of the i th beam, causes the phase-matching diagram in illustration (A) of FIG. 1 to collapse to the diagram shown in illustration (A) of FIG. 1. Thus, for use in a gas, the three wave mixing process requires an essentially collinear focusing of the input beams. However, the collinearity as shown possesses a problem in regard to spatial resolution. Since the CARS signal is coherent and undergoes an integrative growth process, the spatial resolution cannot be well defined by imaging techniques such as those successfully employed in spontaneous Raman approaches to yield fine resolution. Table 1 shows a tabulation of typical collinear phase-matched CARS probe volumes for various lens focal lengths and beam diameters.

TABLE I

| Collinear phase-matched Prior Art CARS probe volume (powers of 10 in parentheses). | | | |
|---|---|---|---|
| Focal length (cm) | Diameter (cm) | Area (cm$^2$) | Length (cm) |
| 10 | 6.11 (−4) | 2.93 (−7) | 7.32 (−2) |
| 20 | 1.22 (−3) | 1.17 (−6) | 2.93 (−1) |
| 50 | 3.06 (−3) | 7.35 (−6) | 1.83 |
| 100 | 6.11 (−3) | 2.93 (−5) | 7.32 |

As seen, for the longer focal length lenses, the spatial resolution can be very poor.

Figure 2:
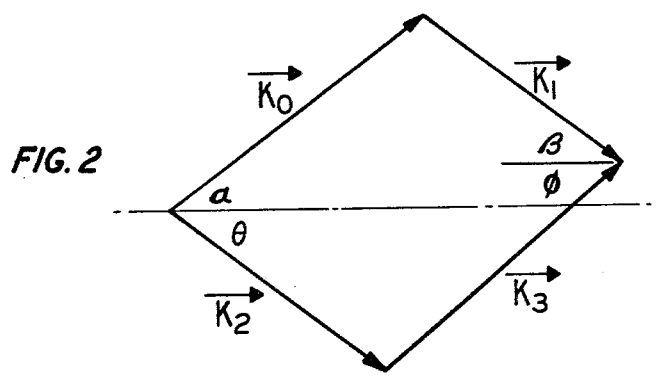
FIG. 2 is a schematic representation of a phase-matching diagram in accordance with the present invention.

A method which permits large angular separation in the input beams while still satisfying the phase-matching requirements is shown in FIG. 2. FIG. 2 depicts a planar embodiment of the invention. It is to be recognized that phase-matching can be accomplished with non-planar wave vectors as long as $\vec{K}_0 + \vec{K}_1 = \vec{K}_2 + \vec{K}_3$. Utilizing this approach two separate pump beams designated by $\vec{K}_0$ and $\vec{K}_1$ are crossed into the interaction zone, as shown in more detail in FIG. 3, at half-angles of $\alpha$ and $\beta$ respectively. The Stokes beam designated by $\vec{K}_2$ is crossed into the interaction zone at an angle $\theta$ and mixed with pumping beams producing the phase-matched CARS beams designated by $\vec{K}_3$ at an angle $\Phi$. As shown by the phase-matching diagram of FIG. 2, the appropriate phase-matching angles are readily related from simple geometric considerations as follows:

$$n_0\omega_0 \cos \alpha + n_1\omega_1 \cos \beta = n_2\omega_2 \cos \theta + n_3\omega_3 \cos \Phi \qquad (1)$$

$$n_0\omega_0 \sin \alpha - n_1\omega_1 \sin \beta = n_3\omega_3 \sin \Phi - n_2\omega_2 \sin \theta \qquad (2)$$

Table 2 lists several phase matching angles in accordance with equations (1) and (2) for the generation of CARS radiation in accordance with the present invention in nitrogen gas. The values in Table 2 were calculated assuming a pump beam wavelength of 5320 Å, $\vec{K}_0 = \vec{K}_1$ and the angle $\alpha$ = angle $\beta$. As shown in Table 2 very large angles between the focused pump beams and the Stokes beam are possible. The large angles result in a minimization of the interaction zone. Although large angles are possible, small angles are of most interest for diagnostic applications of the present invention where input and output optical apertures are limited. Additionally, the angular separation ($\theta$-$\beta$) and ($\theta$-$\alpha$) between the Stokes beam and either the first or second pump beams is generally large enough to preclude significant CARS generation between these individual components. The generation of a coherent anti-Stokes Raman beam can clearly occur only where all three input beams overlap (coexist) leading to unambiguous spatial resolution. By proper design, this interaction zone (or volume) can be made acceptably small for most diagnostic application (i.e. less than 1 millimeter). It is to be recognized that prior art CARS generation utilized two input beams, but required two photons of the pump beam to mix with one photon of the Stokes beam. In accordance with the present invention two pumping beams are mixed with the Stokes beam to generate the CARS signal, where the CARS signal has a frequency $\omega_3 = \omega_0 + \omega_1 - \omega_2$ and $\omega_1 - \omega_2 = \omega_{Raman}$. $\omega_{Raman}$ is the frequency of the Raman resonance of the molecule being probed, e.g. a vibrational-rotational Raman transition.

TABLE II

| CARS generation for cross-beam phase-matching angles | | | | | |
|---|---|---|---|---|---|
| $\theta$ | $\alpha$ | $\Phi$ | $\theta$ | $\alpha$ | $\Phi$ |
| 5 | 4.38 | 3.89 | 60 | 50.7 | 42.5 |
| 10 | 8.81 | 7.78 | 70 | 57.8 | 47.1 |
| 15 | 13.2 | 11.6 | 80 | 64.1 | 60.1 |
| 20 | 17.6 | 15.5 | 90 | 69.4 | 51.2 |
| 25 | 21.9 | 19.2 | 120 | 78.7 | 42.5 |
| 30 | 26.2 | 22.9 | 150 | 82.1 | 22.9 |
| 40 | 34.7 | 30.1 | 180 | 82.9 | 0 |
| 50 | 42.9 | 36.7 | | | |

Figure 3:
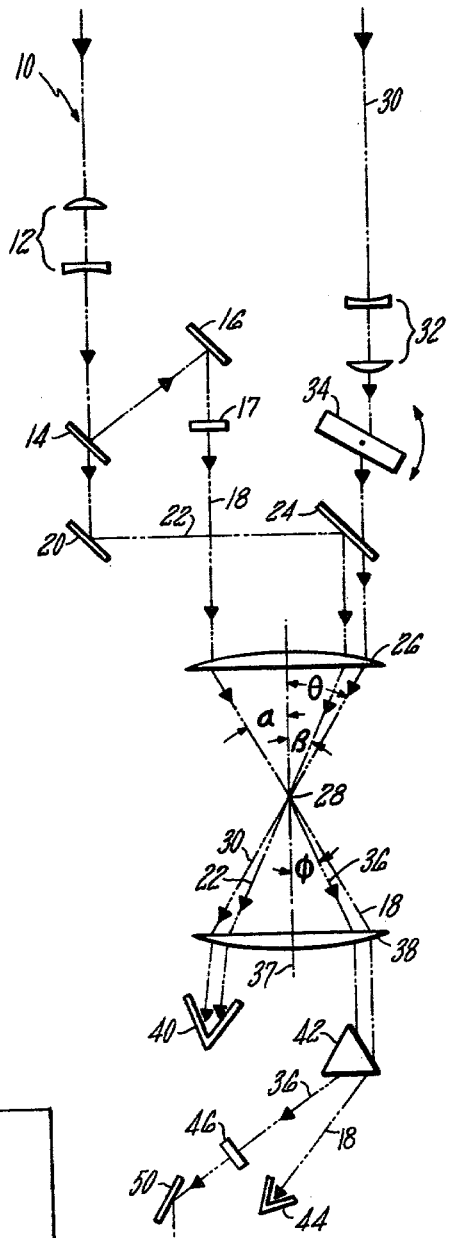
FIG. 3 is a schematic diagram of a simplified optical system for generating coherent anti-Stokes Raman radiation in accordance with the present invention.

Referring now to FIG. 3, an optical system adapted for generating coherent anti-Stokes Raman radiation in accordance with the present invention is shown. A beam of radiation 10 from a coherent source of radiation (not shown) is directed into a telescopic lens system 12 and is made incident onto a first beam splitter 14, where a portion of the beam is reflected to a turning mirror 16 and passed through a frequency shifting means 17 to provide a first pump beam 18 having a frequency $\omega_0$, and the remaining portion of the beam is passed through the first beam splitter to a second turning mirror 20 to provide a second pump beam 22 having a frequency $\omega_1$. The second turning mirror directs the second pump beam to a dichroic mirror 24 adapted for directing the second pump beam to a focusing lens 26. The first turning mirror directs the first pump beam 18 to the focusing lens where both pump beams are focused into an interaction zone 28 located at the focal length of the focusing lens. The first pump beam is focused into the focal zone at a half angle $\alpha$ while the second pump beam is focused into the interaction zone at a half angle $\beta$. It is to be recognized that the angle $\alpha$ may be equal to the angle $\beta$. It is also to be recognized that $\omega_0$ can be equal to $\omega_1$ by removing the frequency shifting means 17 from the system.

A Stokes beam 30 having a frequency $\omega_2$ from a source (not shown) passes through a second telescope 32, through an optical flat 34 adapted for rotation and through the dichroic mirror 24 and is incident onto the focusing lens 26 which focuses the Stokes beam into the interaction zone at a half angle $\theta$. The three beams mix within the interaction zone to generate a coherent anti-Stokes Raman beam 36 having a frequency $\omega_3$ and a half angle of $\Phi$ to the central lens axis 37. After passing through the interaction zone, the four beams (that is, the first and second pump beams 18, 22, the Stokes beam 30 and the coherent anti-Stokes Raman beam 36) are recollimated by a collecting lens 38, generally but not necessarily having the same focal length as the focusing lens 26. The Stokes beam 30 and the second pump beam 22 are trapped by a trap 40 and eliminated from the system. It is to be recognized that the Stokes and second pump beams could be sent to a reference leg to generate a normalizing signal.

In the preferred embodiment, small half angles are usually employed resulting in the first pump beam 18 and the anti-Stokes Raman beam 36 being angularly separated but typically not spatially separated. Additional angular separation of the two beams is achieved by passing both beams through a suitable prism 42. After passing a suitable distance from the prism the second pump beam is trapped in a second trap 44 and eliminated from the system. The coherent anti-Stokes Raman beam is passed through cut-off filters 46 and directed to a spectrometer 48 by a third turning mirror 50. Typically the spectrometer would also include a photomultiplier 52 or an optical multi-channel analyzer for analysis. The system as shown in FIG. 3 is capable of generating very intense CARS radiation. A single beam is utilized in the apparatus shown in FIG. 3 to provide the first and second pump beams with identical frequencies. It is to be recognized that the pump beams may be provided from separate sources having differing frequencies or may be provided from the same source with the frequency of one of the pump beams modified by means well known in the art.

In the operation of the optical system shown in FIG. 3, the pump beams and the Raman beam are aligned parallel to each other when incident onto the focusing lens 26 to enable the focusing lens to focus the beams into the interaction zone 28 located at the focal length of the focusing lens. The optical flat 34 inserted in the Stokes beam path permits the phase-matching angle $\theta$ to be readily varied without changing the optical alignment of the system. The telescopic lens systems 12, 32 respectively located in the path of the beam of radiation 10 and the path of the Stokes beam 30 are utilized to render the input beams collimated prior to being focused by the focusing lens 26. This insures that the individual beams focus at the crossing point within the interaction zone 28 and controls the waist size (minimum beam cross-sectional area) of the focused beams. In a particular optical system an 89 millimeter diameter 483 millimeter focal length lens was employed as the focusing lens 26 with the first and second pump beams having a wavelength of 5320 Å generated by frequency-doubling a neodymium:YAG laser. CARS radiation was generated from nitrogen in room air. The optical flat 34 was rotated to provide an angle $\theta$ of 3.6 degrees. At the small crossing angles employed, the generated CARS signal 36, and the second pump beam 18 component were only separated by approximately a half a degree. Additional angular separation was achieved by an extra dense flint prism. In operation, the optical flat 34 was rotated to vary the angle $\theta$ until a maximum CARS signal is generated.

As noted previously all three input beams 18, 22 and 30 are aligned parallel to each other in a single plane and directed to the focusing lens 26. If the beams are aligned properly they will cross at the focal point of the lens by definition. However, due to wavefront sphericity they may not necessarily waist at the crossing point. To insure that a minimum beam waist occurs at the crossing point, the adjustable telescopes are utilized. At high laser intensity the beams are readily visualized near the interaction zone in room air by Rayleigh scattering. The telescopes are then adjusted to visually produce minimum waisting at the crossing point. In the preferred embodiment the path lengths of the pump beams are adjusted so that both pump beams waist at the crossing point.

It is to be recognized that although the input beams shown in FIG. 3 lie within one plane, the invention may be practiced with the pump and Stokes beams non-coplanar. It is also to be recognized that if either of the pump beams 18, 22 as shown in FIG. 3 or the Stokes beam 30 is blocked such that it is not focused into the interaction zone, the CARS signal is not generated.

Figure 4:
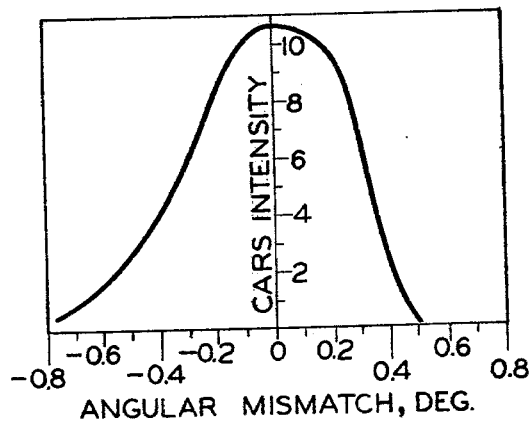
FIG. 4 is a graph showing the effect of angular mismatch of the input beams on the CARS generated signal.

Referring now to FIG. 4 the variation of the CARS signal with deviation in $\theta$ from the optimum phase-matching angle is shown. The angular mismatch was calculated based upon the rotation angle of the optical flat 34, its thickness and by assuming its refractive index to be 1.5. Roughly each 0.1 degree of angular deviation corresponds to a calculated phase mismatch, $\Delta K$, of about 20 cm$^{-1}$. The CARS signal shows little variation in magnitude for misalignments up to 0.1°. Beyond that, the signal declines fairly slowly with increasing misalignment. As is apparent from FIG. 4 the variation in signal is not symmetric about the optimum angle. The slower decrease in signal with increasing negative angular misalignment is probably due to a larger interaction length within the interaction zone as the Stokes beam moves closer to the pump beam than when the separation between the beams increases.

Figure 5:
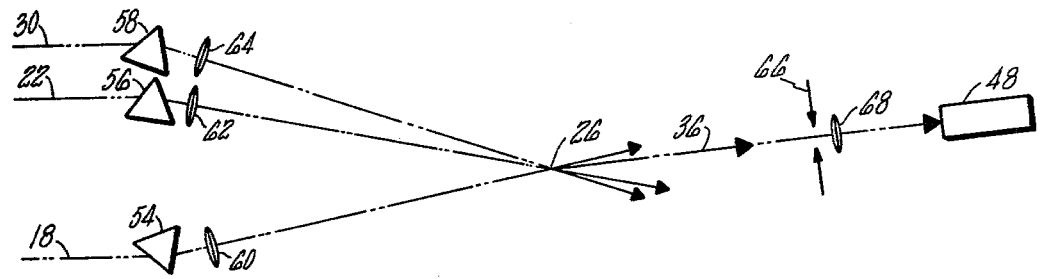
FIG. 5 is an embodiment of the present invention wherein the input beams are focused in the forward direction with individual lenses.

Referring now to FIG. 5, wherein an embodiment of the present invention is shown, the first and second pump beams 18, 22 and the Stokes beam 30 are each directed in a parallel relationship to one another to separate turning prisms 54, 56, 58 respectively. The input beams then pass through individual lenses 60, 62, 64 which focuses the beams to the interaction zone 26. The CARS beam 36, generated by the three wave mixing of the input beams, passes through an aperture 66 and is focused onto the analyzer 48 by lens 68. The embodiment as shown in FIG. 5 is essentially the embodiment as shown in FIG. 3 wherein the single focusing lens 24 is replaced by a plurality of individual lenses 60, 62, 64 within each of the beam paths. The utilization of the individual prisms also enables the use of non-parallel input beams since the prism-lens combination may be adjusted to obtain proper focusing.

Figure 6:
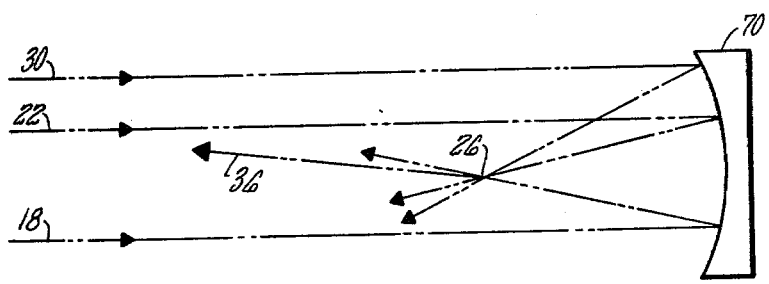
FIG. 6 is an embodiment of the present invention wherein the input beams are focused to a focal zone in the reverse direction.

Referring now to FIG. 6, an embodiment is shown wherein the first and second pump beams 18, 22 and the Stokes beam 30 are focused to the interaction zone 26 by a focusing mirror 70.

Figure 7:
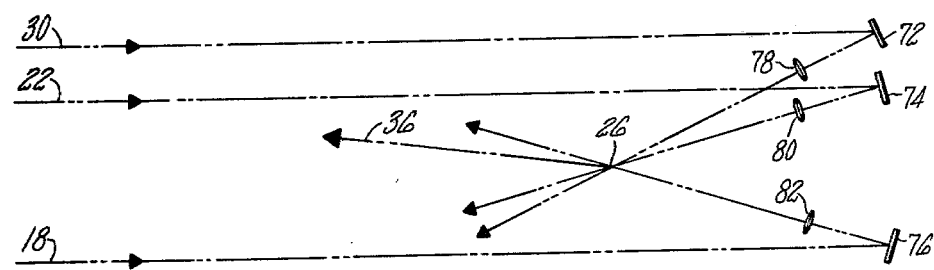
FIG. 7 is an embodiment of the invention similar to that of FIG. 6 wherein the input beams are focused in the reverse direction with individual lenses.

Referring now to FIG. 7, the focusing mirror 70 shown in FIG. 6 is replaced by a plurality of individual mirrors 72, 74, 76 and individual focusing lenses 78, 80, 82 to focus all three input beams into the interaction zone 26. It is to be recognized that each mirror-lens combination may be replaced with a focusing mirror.

Although this invention has been shown and described with respect to preferred embodiments thereof, it should be understood by those skilled in the art that various changes and omissions in the form and detail thereof may be made therein without departing from the spirit and scope of the invention.

Having thus described preferred embodiments of my invention, that which I claim as new and desire to secure by Letters Patent of the United States is:

1. In a method of generating coherent anti-Stokes Raman radiation in a medium of interest disposed around a point along an axis, the steps of:
   simultaneously directing a first pump beam of coherent radiation at a frequency $\omega_0$ through said point along a path at an angle $\alpha$ with respect to said axis, directing a second pump beam of coherent radiation at a frequency $\omega_1$ through said point along a path at an angle $\beta$ with respect to said axis, and directing a Stokes beam of coherent radiation at a frequency $\omega_2$ through said point along a path at an angle $\theta$ with respect to said axis;
   focusing said beams so that each of said beams converges to its minimum beam cross-section area substantially at said point, the center of each beam crossing each other beam substantially at said point, whereby three wave mixing of said beams generates an anti-Stokes Raman beam of coherent radiation at a frequency $\omega_3$ and along a line through said point at an angle $\Phi$ with respect to said axis, said angles being related to said frequencies by the relationship $n_0\omega_0 \cos \alpha + n_1\omega_1 \cos \beta = n_2\omega_2 \cos \theta + n_3\omega_3 \cos \Phi$, where $n_0$ is the index of refraction of said medium at frequency $\omega_0$, $n_1$ is the index of refraction of said medium at frequency $\omega_1$, $n_2$ is the index of refraction of said medium at frequency $\omega_2$, and $n_3$ is the index of refraction of said medium at frequency $\omega_3$, whereby the spatial resolution of said anti-Stokes Raman beam generation is limited to a volume of said medium along said axis within which all three of said directed beams coexist.

2. A system for generating a coherent anti-Stokes beam of radiation in a controllable, spatially limited region of a medium of interest, comprising:
   means for simultaneously directing through a point on an axis within said medium three beams of coherent radiation at frequencies $\omega_0$, $\omega_1$ and $\omega_2$ along paths at angles to said axis of $\alpha$, $\beta$, and $\theta$, respectively, where $\omega_1 - \omega_2$ is a Raman resonance frequency of said medium;
   means for focusing each of said beams for convergence of each beam to a minimum bean cross-sectional area at said point to produce, by three wave mixing in said medium, an anti-Stokes Raman beam of coherent radiation along a line through said point at an angle $\Phi$ to said axis and at a frequency $\omega_3$, said angles being related to said frequencies by the relationship $n_0\omega_0 \cos \alpha + n_1\omega_1 \cos \beta = n_2\omega_2 \cos \theta + n_3\omega_3 \cos \Phi$, where $n_0$ is the index of refraction of said medium at frequency $\omega_0$, $n_1$ is the index of refraction of said medium at frequency $\omega_1$, $n_2$ is the index of refraction of said medium at frequency $\omega_2$, and $n_3$ is the index of refraction of said medium at frequency $\omega_3$, whereby the region of response of said system to said medium is limited to a volume within which all three of said directed beams coexist as defined by their cross-sectional areas near said point and their angles to said axis.

3. A system according to claim 2 wherein said directing means includes means for adjusting the collimation of at least one of said directed beams in advance of said focusing means, to thereby adjust the minimum cross-sectional area of such beam near said point, whereby the spatial extent of said region of response of said medium is adjustable.

4. A system according to claim 2 wherein said directing means includes means for adjusting said angle $\theta$ to thereby adjust the phase match of said directed waves in said medium.

* * * * *

UNITED STATES PATENT AND TRADEMARK OFFICE
CERTIFICATE OF CORRECTION

PATENT NO. : 4,277,760
DATED : July 7, 1981
INVENTOR(S) : Alan C. Eckbreth

It is certified that error appears in the above—identified patent and that said Letters Patent is hereby corrected as shown below:

Column 2, line 63    "precluse" should read --preclude--

Column 3, line 45    "$K_{11}$" should read --$K_1$--

Column 3, line 46    "$\omega_{11}$" should read --$\omega_1$--

Column 3, line 47    "$\omega_1 n_{11}/c$" should read --$\omega_1 n_1/c$--

Column 3, line 67    "(A)" should read --(B)--

Column 5, line 5    "$\omega_1-\omega_2 = \omega_{Raman}$." should read --$\omega_1 - \omega_2 = \omega_{Raman}$, where--

Column 5, line 67    "not spatially separated" should read --not sufficiently spatially separated--

Column 7, line 26    "26" should read --28--

UNITED STATES PATENT AND TRADEMARK OFFICE
CERTIFICATE OF CORRECTION

PATENT NO. : 4,277,760
DATED : July 7, 1981
INVENTOR(S) : Alan C. Eckbreth

It is certified that error appears in the above—identified patent and that said Letters Patent is hereby corrected as shown below:

Column 7, line 39   "26" should read --28--

Column 7, line 45   "26" should read --28--

Signed and Sealed this

Twenty-seventh Day of April 1982

[SEAL]

Attest:

GERALD J. MOSSINGHOFF

Attesting Officer    Commissioner of Patents and Trademarks